Sept. 22, 1953     F. OSBORNE     2,652,987
PRECISION CROSS WINDING FOR YARNS
Filed May 12, 1949     15 Sheets-Sheet 1
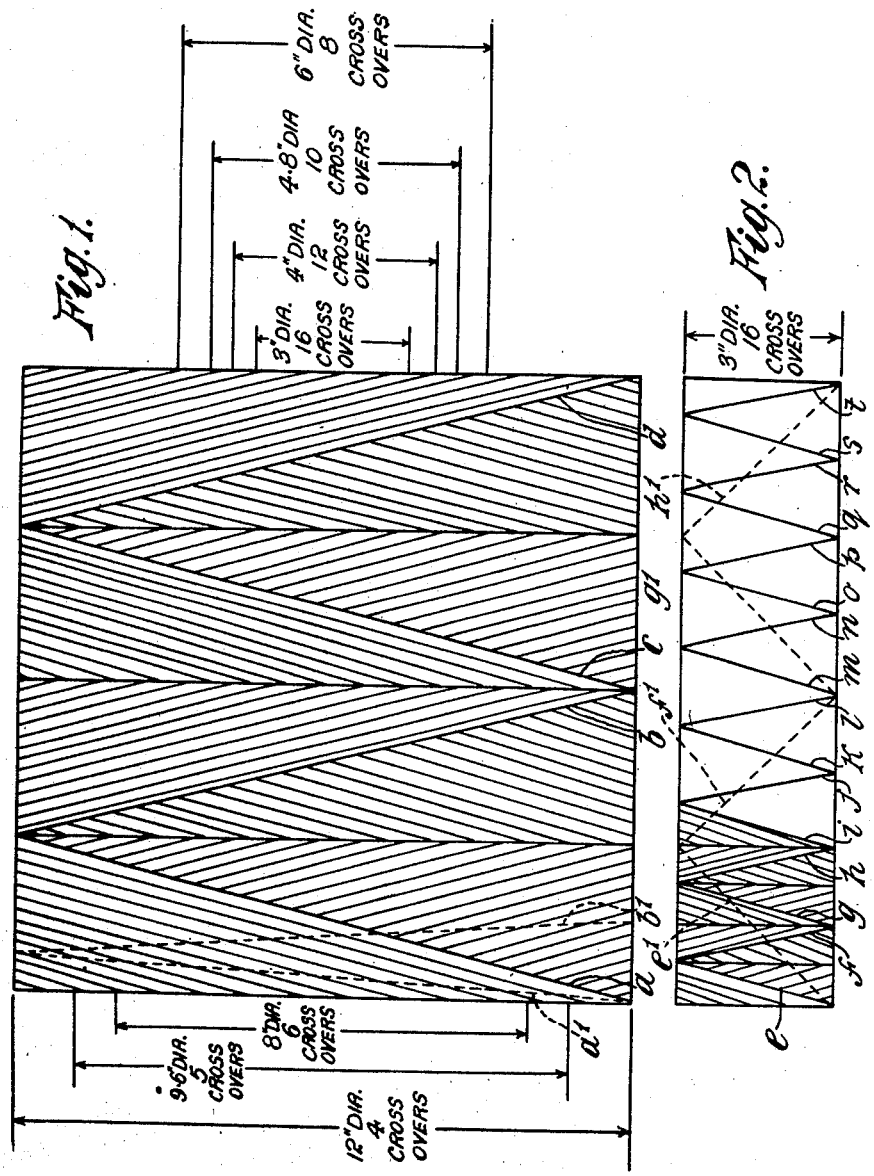
INVENTOR
FRANK OSBORNE
BY Francis E. Boyer
ATTORNEY

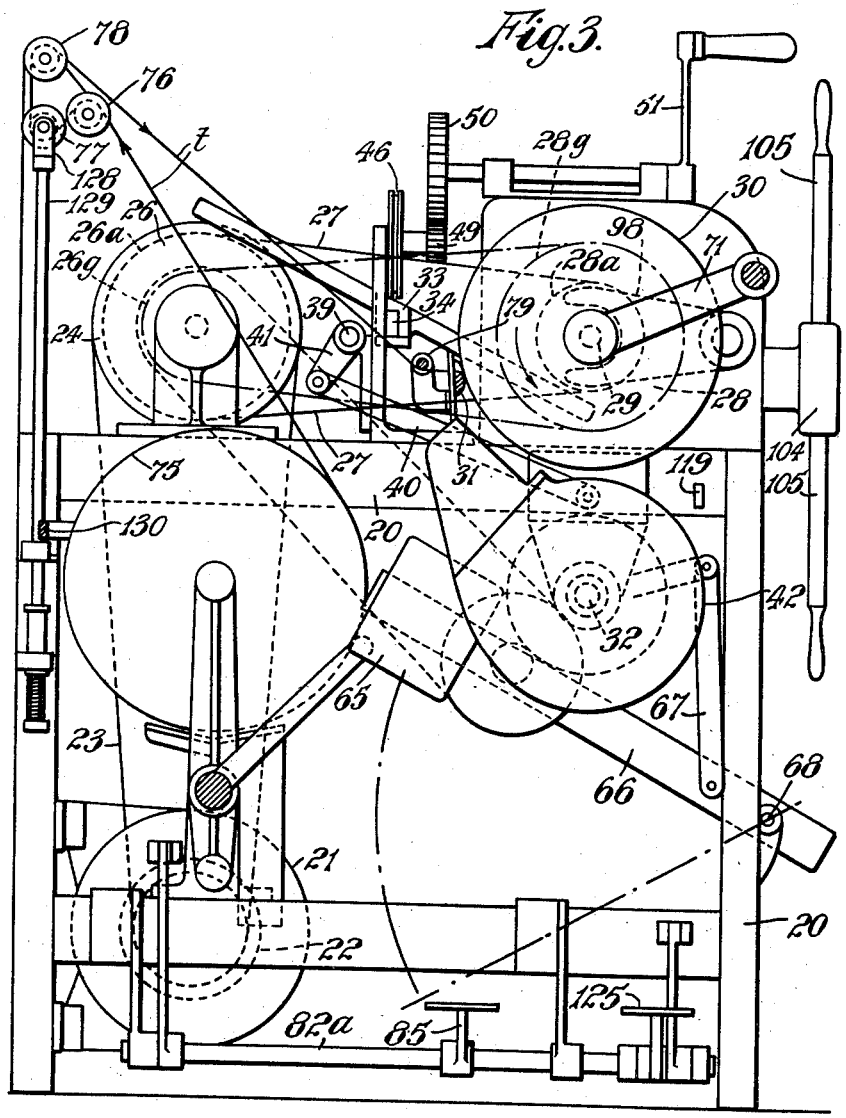

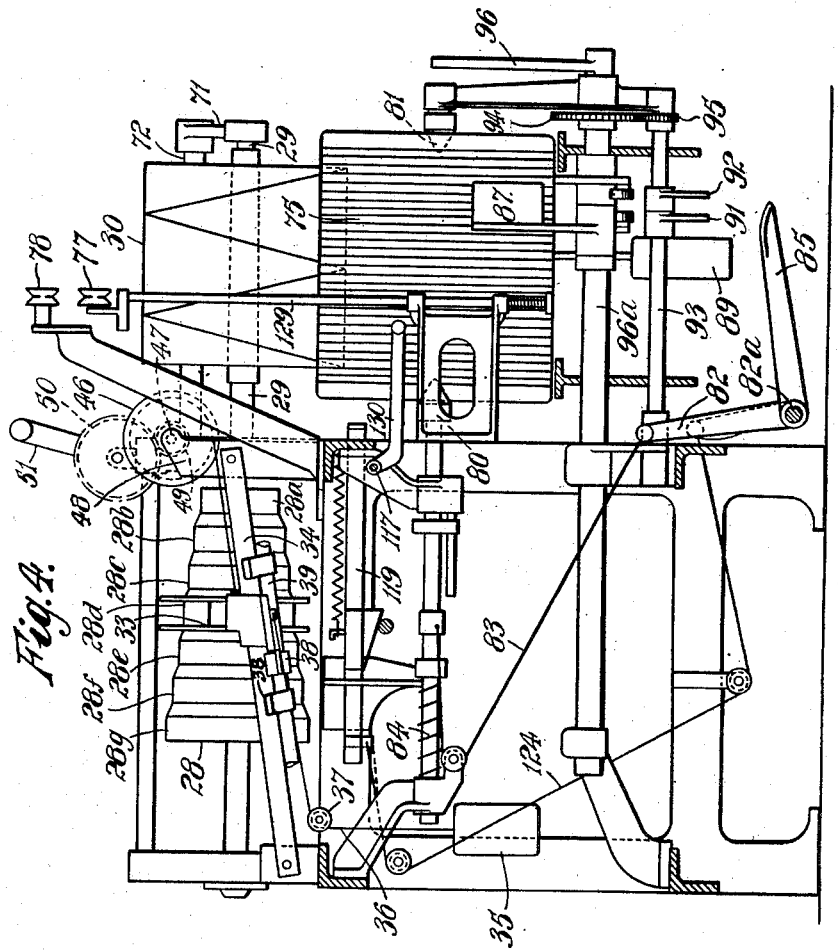

Sept. 22, 1953

F. OSBORNE 2,652,987

PRECISION CROSS WINDING FOR YARNS

Filed May 12, 1949

INVENTOR
FRANK OSBORNE
BY Francis E. Boyer
ATTORNEY

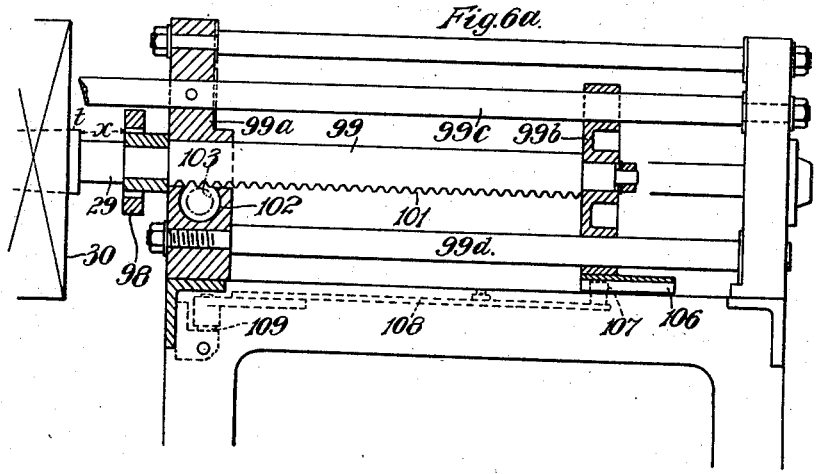
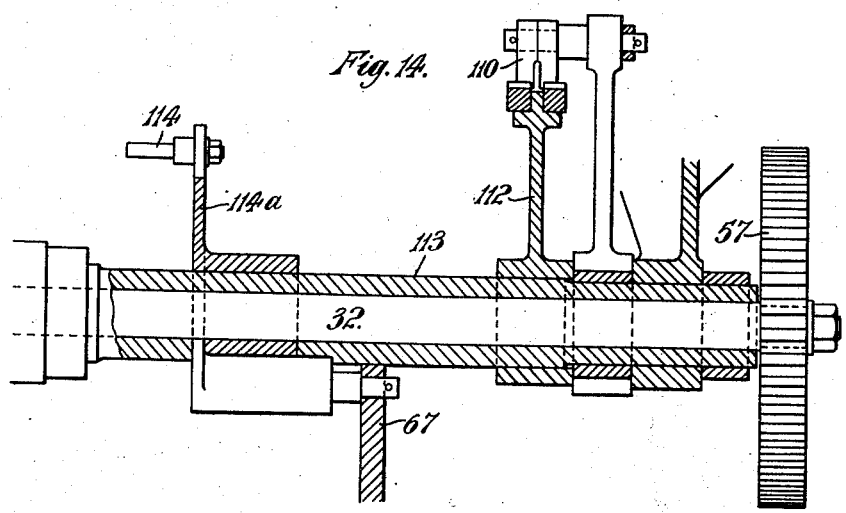

Sept. 22, 1953 F. OSBORNE 2,652,987
PRECISION CROSS WINDING FOR YARNS
Filed May 12, 1949 15 Sheets-Sheet 7

Fig. 7.

INVENTOR
FRANK OSBORNE
BY Francis E. Boyle
ATTORNEY

Sept. 22, 1953　　　　　F. OSBORNE　　　　　2,652,987
PRECISION CROSS WINDING FOR YARNS
Filed May 12, 1949　　　　　　　　　　　　15 Sheets-Sheet 8
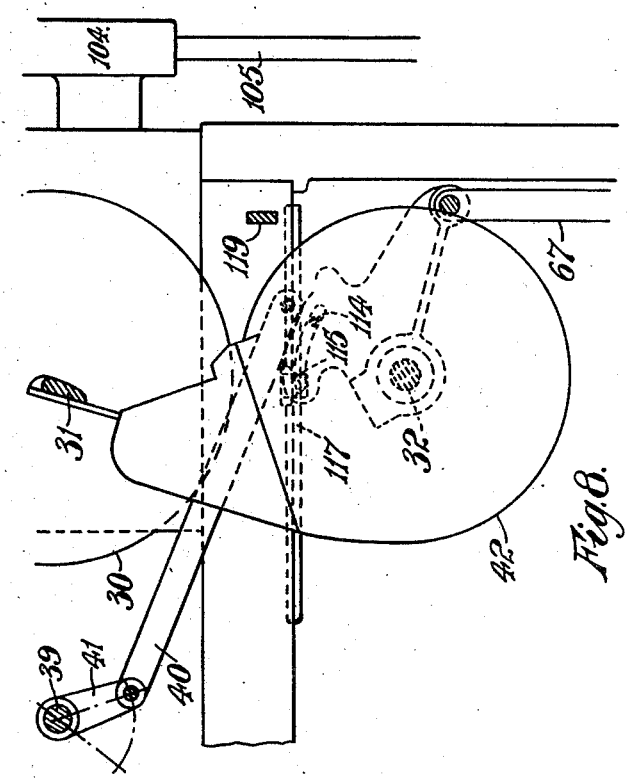
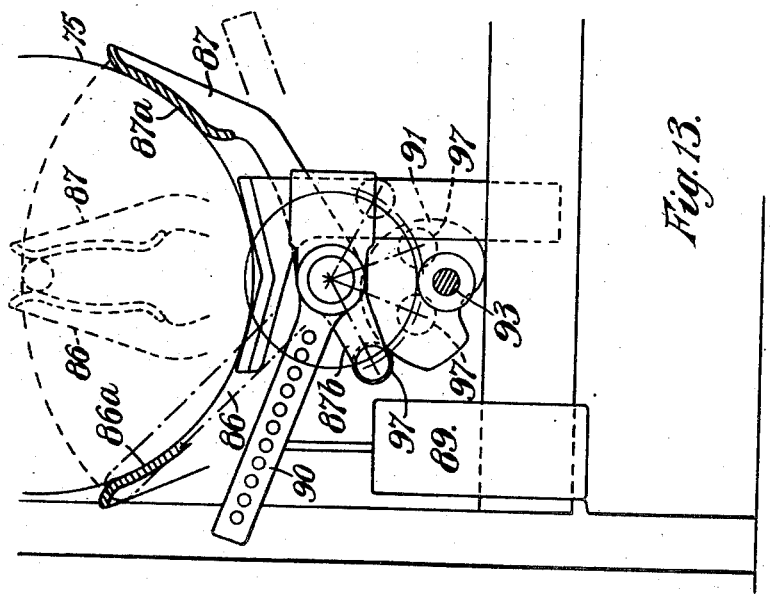
INVENTOR
FRANK OSBORNE
BY Francis E. Boyce
ATTORNEY

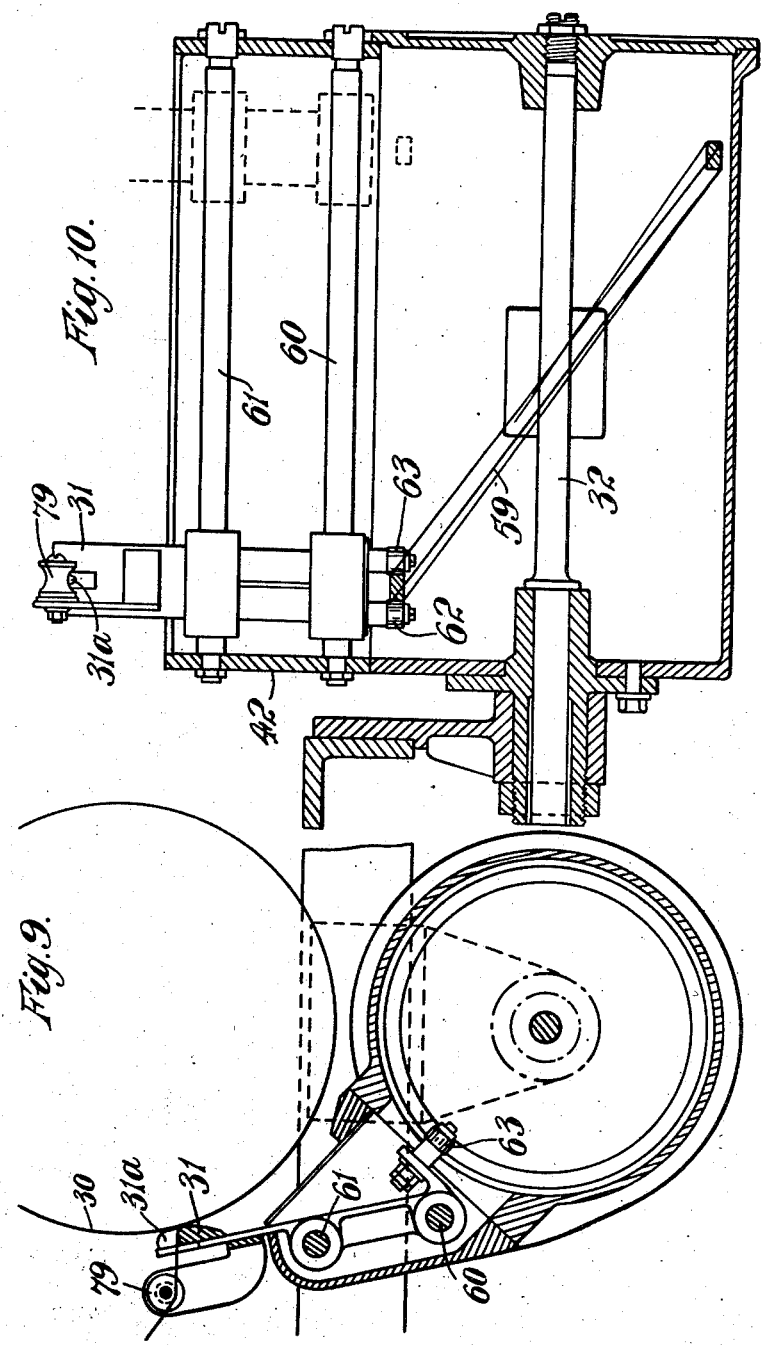

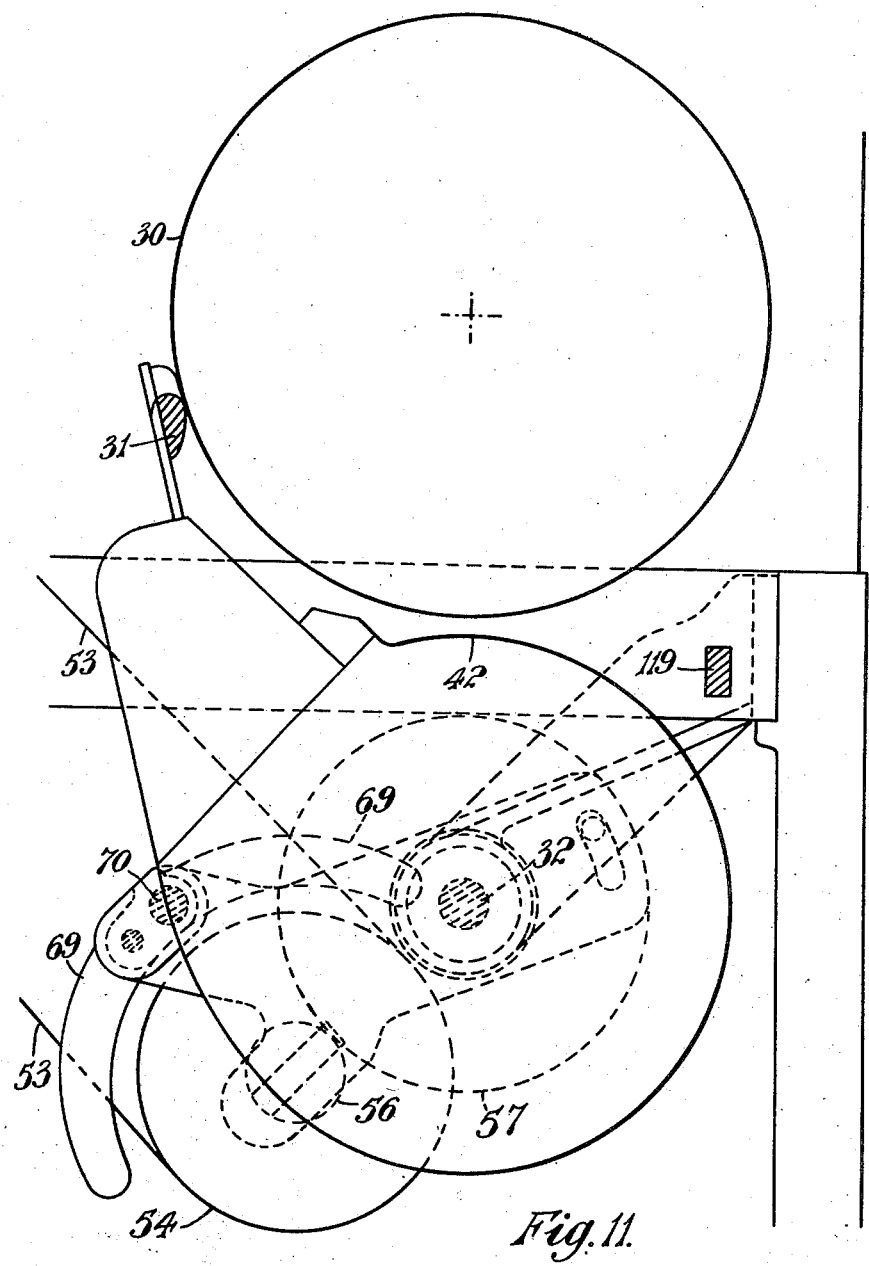

Sept. 22, 1953 F. OSBORNE 2,652,987
PRECISION CROSS WINDING FOR YARNS
Filed May 12, 1949 15 Sheets-Sheet 11

INVENTOR
FRANK OSBORNE
BY Francis E. Boyce
ATTORNEY

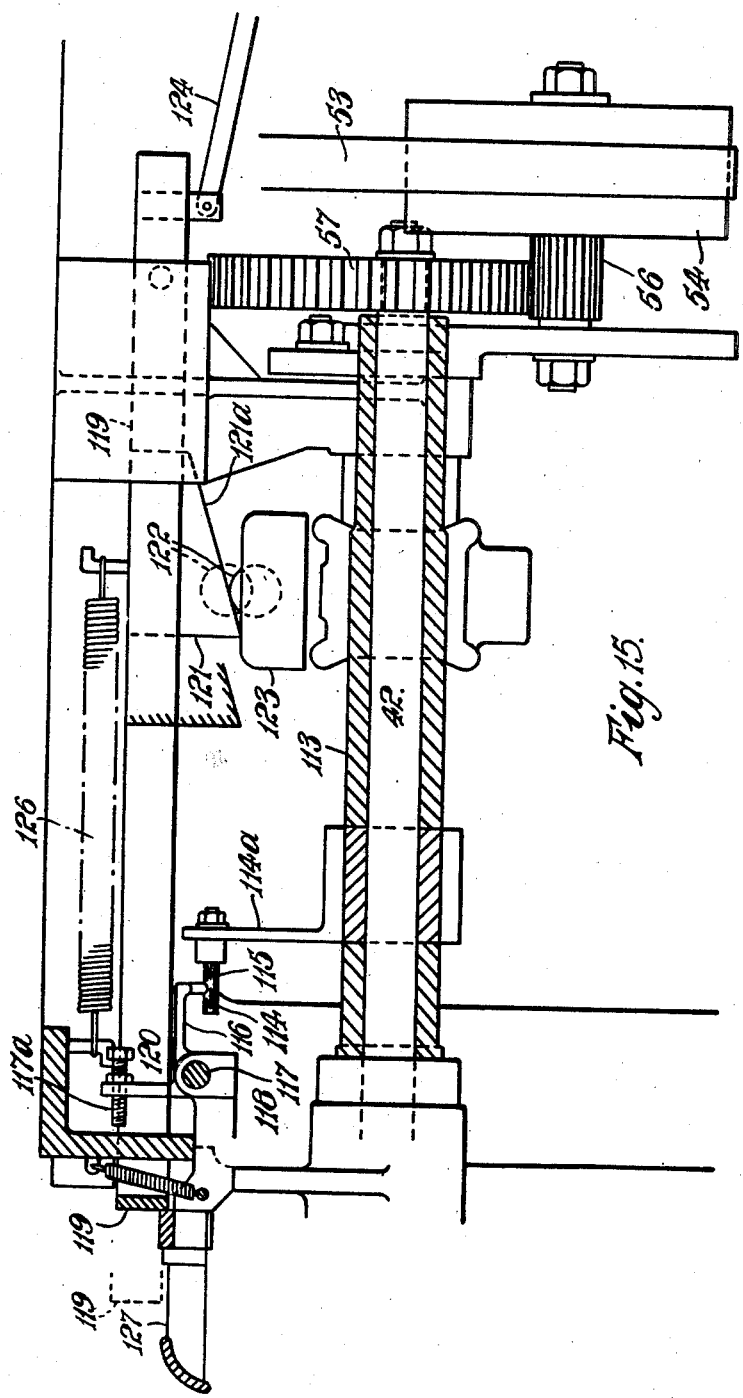

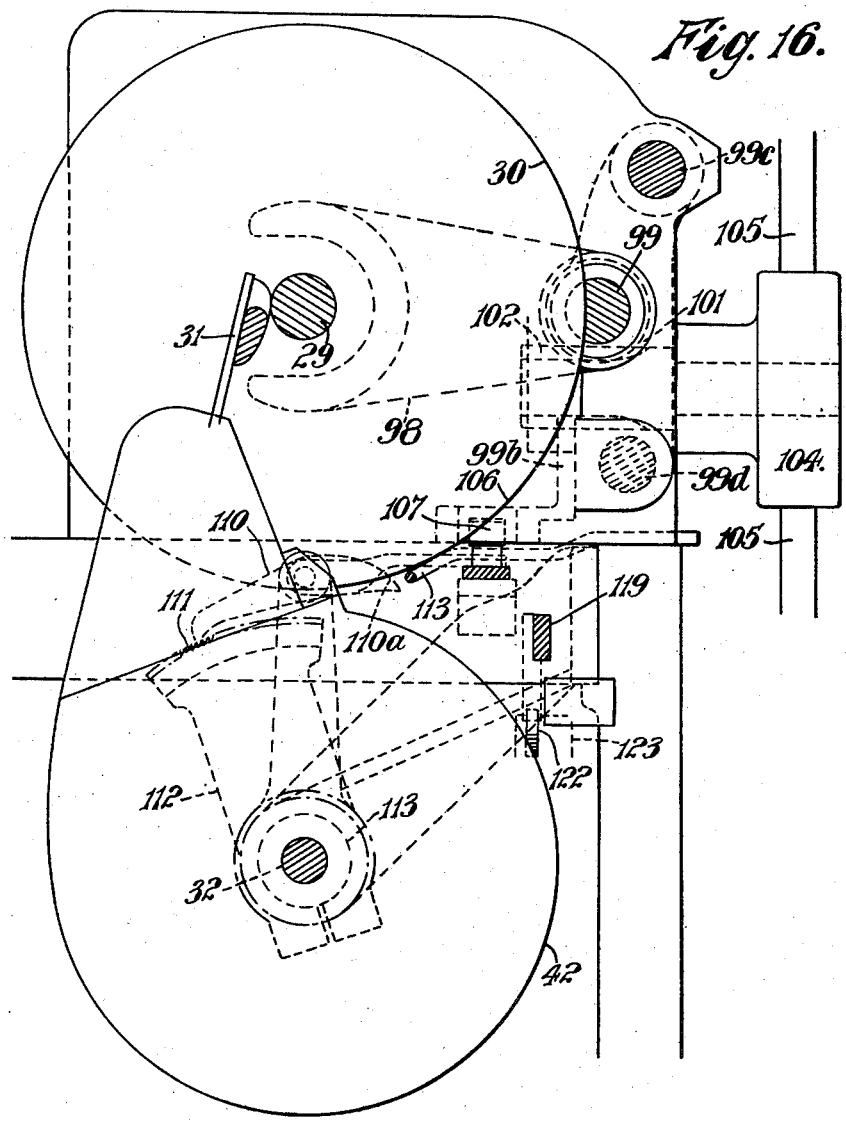

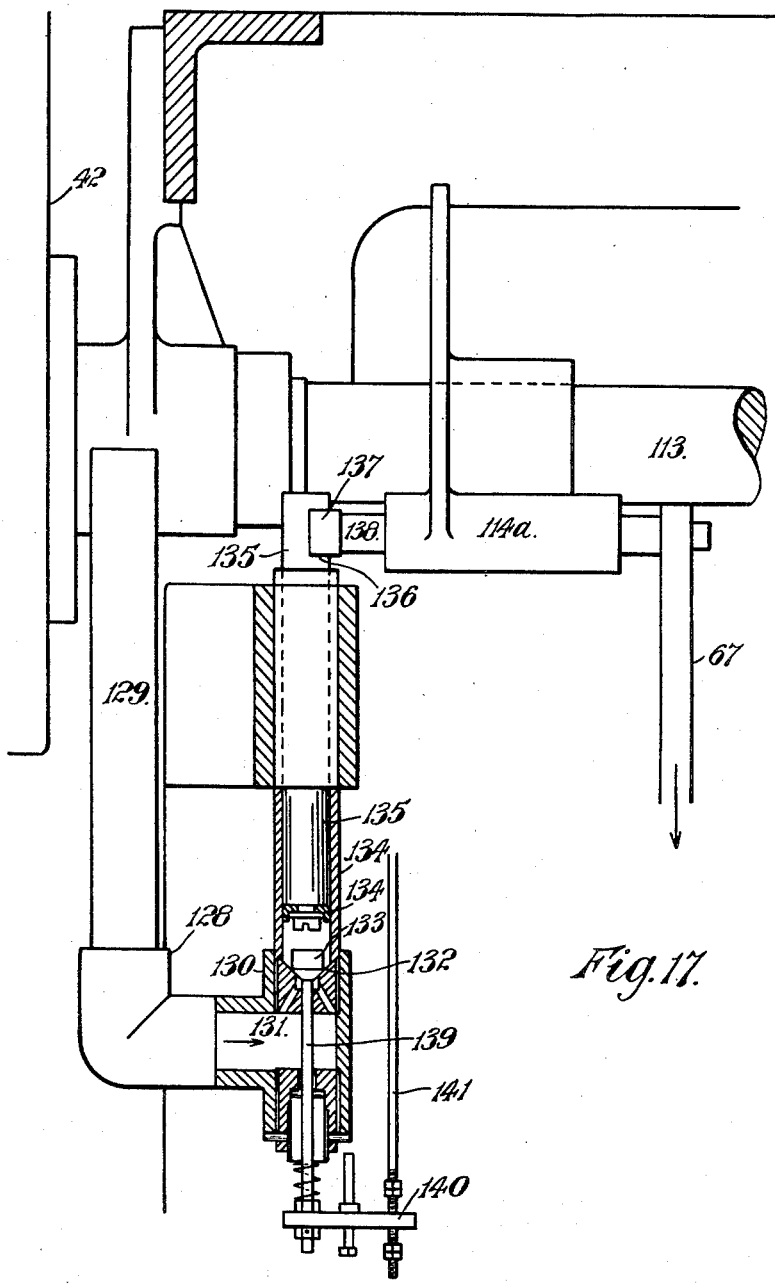

Patented Sept. 22, 1953

2,652,987

UNITED STATES PATENT OFFICE 2,652,987

PRECISION CROSS WINDING FOR YARNS

Frank Osborne, Adlington, near Macclesfield, England, assignor to Wm. Ayrton & Company, Limited, Longsight, Manchester, England, a British company Application May 12, 1949, Serial No. 92,789
In Great Britain May 20, 1948

9 Claims. (Cl. 242—43)

This invention relates to an improved process and apparatus for the precision cross-winding of yarns, threads, cords, filaments, and the like, all denoted hereinafter by the general term "yarns," to form cops, cheeses or other packages hereinafter generically termed "packages."

As is well-known, precision cross-winding may produce either a so-called "honeycomb" pattern, or a relatively open or close herringbone pattern, which latter provides a compact package of yarn with the maximum length or weight of yarn for a given size of package. In either case, precision cross-winding gives the package natural strength for retaining its shape, particularly at the ends, without external support. Cross-wound packages are usually cylindrical, or conical, and during winding, the yarn is traversed from end-to-end of the package in a definite ratio to the spindle rotation, with or without a definite fractional difference. Such ratio determines the number of cross-overs in the length of the package. Without such fractional difference, a "honeycomb" wind is obtained, while the amount of any such fractional difference determines according to the count, denier, or diameter of the yarn whether an open or close wind is obtained, either of which produces a herringbone effect.

It is known that, on the larger diameter of packages, there is a maximum for the number of cross-overs which can be provided for a given length and diameter of package and beyond which the package loses its stability of shape. This factor has hitherto determined the ratio between the spindle speed and traverse speed throughout the package, since, the ratio being constant in any one winding operation, the number of cross-overs at the commencement of winding has had to be the same as the maximum possible at the end of the winding operation.

It has been proposed to provide means for varying the speed of rotation of the spindle substantially in proportion to the diameter of the package, so as to maintain an approximately uniform lineal speed for the yarn, but only with constant ratio between the spindle and traverse speeds. Even with such constant lineal speed arrangement, the maximum possible speed of winding at the smaller diameters, i. e., the highest possible rate of spindle rotation, is limited by the highest practical speed for the traverse mechanism, since at any higher speed the traverse mechanism would breakdown.

According to this invention, instead of the ratio between spindle and traverse mechanisms remaining constant throughout the winding operation, such ratio is reduced in positive steps during the winding of the package from a higher ratio at the commencement of the winding operation to a lower ratio at the end of the winding operation, and without interruption of the winding operation, the speed of the traverse mechanism remaining constant, and each ratio being such as to produce a precision cross-wind.

As a result of this mode of procedure, precision cross-winding is obtained in each stage, but the number of cross-overs in the length of the package is greater for the smaller diameters than for the larger diameters, whereby the spindle speed may be greater for the smaller diameter of package without increasing the traverse speed beyond its practical maximum and without prejuice to the structure of the package.

The changes in the number of cross-overs, due to such variation of spindle speed, substantially maintain a uniform angle of cross-over, and therefore ensure stability of the package throughout its diameter at its ends. Also, the lineal speed of the yarn being wound on remains substantially constant.

Apparatus according to the invention for carrying out the improved method comprises means for holding and rotating a package, a traverse mechanism for laying on the yarn during such rotation, means for driving the traverse mechanism at a constant speed throughout the winding of the cop, and means for varying the ratio of rotation of the cop in positive steps from a higher ratio at the commencement of the winding process to a lower ratio at the end of the winding process, without interruption of the winding, and each ratio being such as to produce a precision cross-wind.

The said means for varying the speed of rotation of the package will be such as to give a step-by-step variation at spaced time intervals during the winding process.

One convenient mode of effecting such step-by-step variation of speed is by employing stepped cone pulleys, preferably with conical portions joining the successive steps, to facilitate transference of the belt from step to step.

The said apparatus may be characterised in that a machine having such stepped cone pulleys, for the purpose stated, has the belt-shifter fork for those pulleys slidably mounted on an inclined guide so as to move by gravity influence throughout its range of speed variation, to traverse the belt from step to step in succession, and in that the step-by-step movement of such fork down the guide is regulated by a series of stop members (one for each change of speed) spaced along a rotatable shaft, these members being set at successively advanced angular positions around the shaft so that, when one moves out of the path of the fork, due to the rotation of the shaft, the next is in the path of the fork to hold it until the continued rotation of the shaft moves that one also away from the fork, and so on, repeatedly for each change of speed. Means will be provided for returning the fork to its initial (highest) position on the inclined guide, and to facilitate this return movement, all the stop members may be within an arc of rotation of less than 360°, so as to leave a clear space for the unobstructed return of the fork. Alternatively, that part of the fork which engages the stop members may be yieldable on the return movement, so as to pass over the stop members. Or, the shaft may be rotated as the belt fork is returned to its highest position so as to move the stop members out of the path of the fork in succession.

The invention may also include a traverse mechanism in which there is a cam box rotatably surrounding a rotary cam shaft and cam, a reciprocating thread layer driven by the cam, and means allowing the thread layer to rotate with the cam box as the cop grows in size, against the pull of a weight holding the thread layer on the package. The weight is preferably adjustable in position so as to vary the degree of pressure of the thread layer on the package, and it may be so mounted (e. g. on a radial arm) as to have a varying effect as the package grows in size. There will be means for the manual (or pedal) rotation of the cam box, independently of package size, so as to withdraw the thread layer from the package when necessary, as may be the case when the yarn breaks. In some forms of the invention, it is the rotary movement imparted to the cam box by the growing diameter of the package which causes the rotary movement of the stop members mentioned above. In effect, therefore, the changes in speed ratio and in number of cross-overs are effected by the growing cop itself as successive pre-selected diameters of package are reached.

The machine will include the usual means for introducing a fractional difference of rotation between the package spindle and the drive to the traverse mechanism (e. g. the rotary cam shaft mentioned above) so as to suit different diameters of yarn and so as to change from a "honeycomb" wind to an open or close wind, and vice versa.

Other features of the invention comprise (a) a support for the outer end of the package spindle, movable axially and rotatably to allow of removal and replacement of the package; (b) similar supporting means for the creel bobbin which constitutes the yarn supply, with friction elements to engage the yarn on the creel bobbin and means for retracting such elements when a fresh creel bobbin is to be placed in position; (c) suitable tensioning means for the yarn, with or without automatic stop means to come into operation in the event of yarn breakages; (d) ejector mechanism for the full package; and (e) adjustable "knock-off" mechanism to stop the machine when the package is fully wound, the adjustment allowing of different sizes of package being wound.

In the accompanying drawings:

Fig. 1 is a diagram showing a package wound according to this invention, which in reality would be 12″ long and 12″ diameter, with four cross-overs $a$, $b$, $c$ and $d$ respectively, and Fig. 2 shows the same package, in its initial stage of winding, at 3″ diameter, showing sixteen cross-overs, $e$, $f$, $g$, $h$, $i$, $j$, $k$, $l$, $m$, $n$, $o$, $p$, $q$, $r$, $s$, $t$.

Fig. 3 is a front elevation of a winding machine constructed in accordance with the invention.

Fig. 4 is a side view looking from the left of Fig. 1, but omitting certain parts for the sake of clarity.

Figure 5:
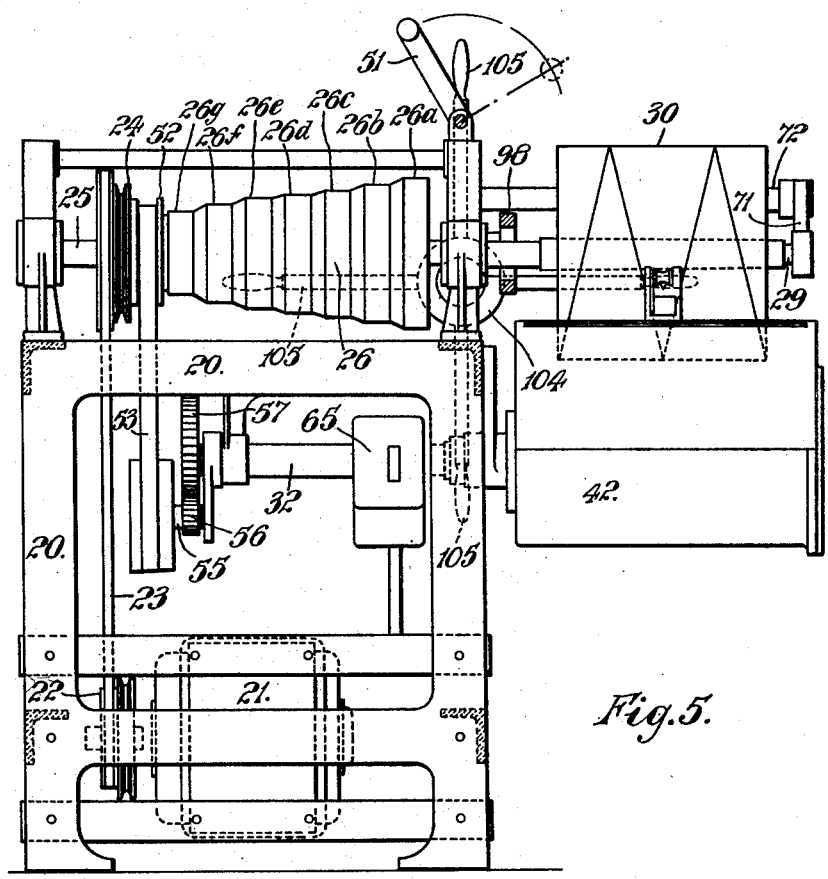
Fig. 5 is a view similar to Fig. 4, also omitting certain parts for the sake of clarity.
Figure 6:
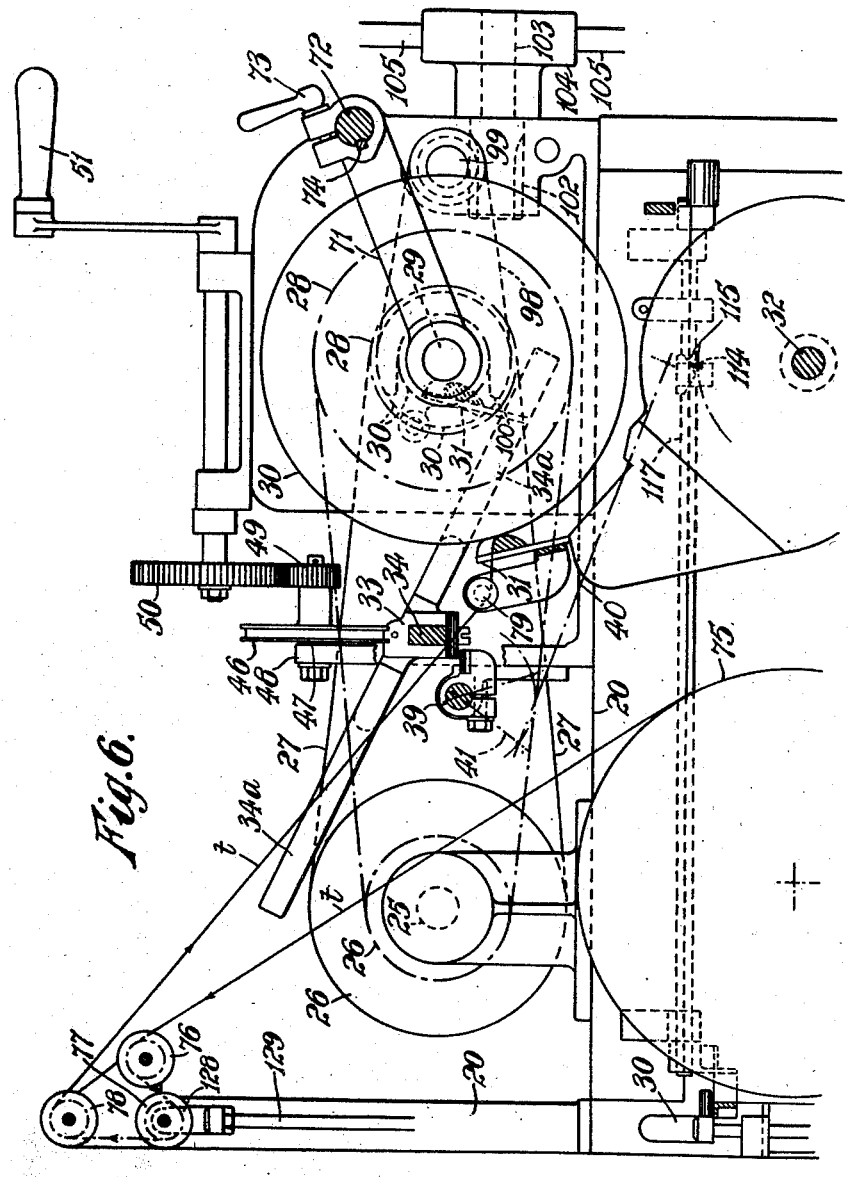

Fig. 6 is a detail view illustrating to a larger scale the means for step-by-step variation of the speed of rotation of the package without interruption of the winding operation, the figure also including the ejector mechanism for removing a package from the spindle on completion of the winding operation, together with the automatic stop means for arresting the winding machine on breakage of the yarn or thread being wound.

Fig. 6a is a further detail view of the mechanism for removing a package from the spindle.

Fig. 7 is a further and sectional detail view on the line 7—7, Fig. 3, of the belt-fork shifter mechanism, illustrating how the belt-shifter fork is operated by the growth in package diameter to give the required speed variation of the package.

Fig. 8 is a detail end view of the cam box, and includes the mechanism connecting the belt-fork shifter mechanism to the cam box of the traverse mechanism.

Figs. 9 and 10 are detail sectional views at right angles to each other of the traverse mechanism for laying the yarn or thread.

Fig. 11 is a detail view illustrating the means for driving the traverse mechanism at a constant speed throughout the winding of the package and the means for introducing a fractional difference of rotation between the package spindle and the traverse driving means.

Figure 12:
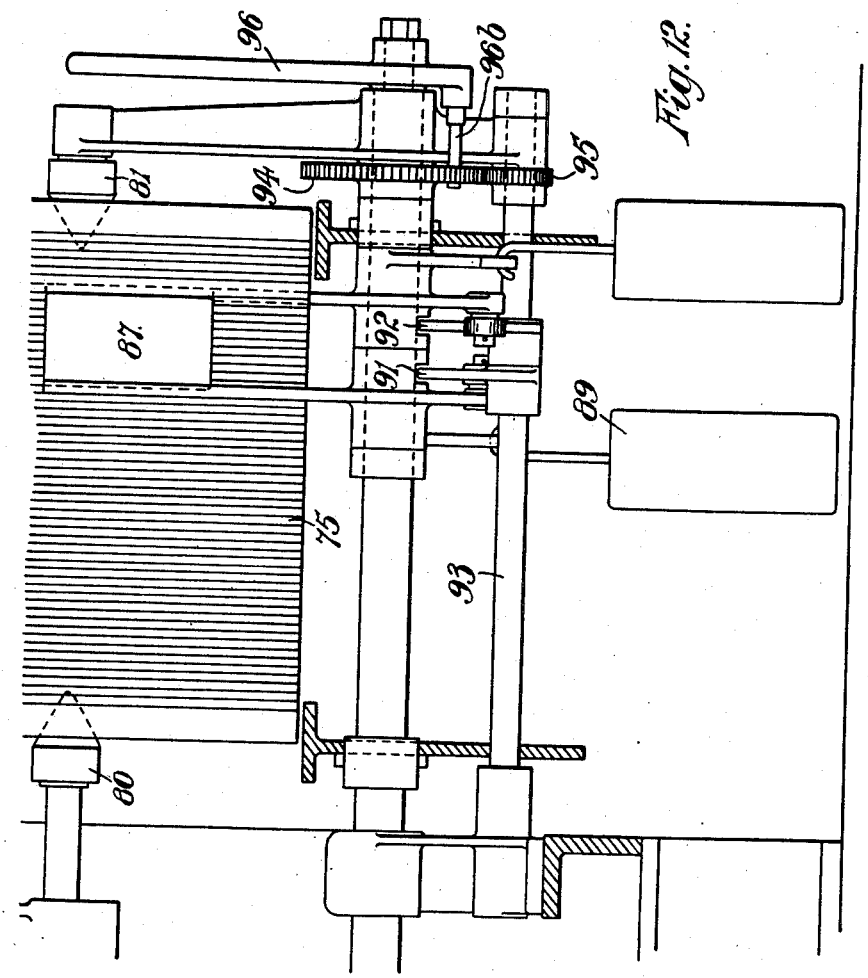

Figs. 12 and 13 are detail views illustrating the supporting means and the friction element for the creel bobbin constituting the yarn supply.

Figs. 14 and 15 are detail views illustrating the automatic stop or "knock-off" mechanism to stop the machine when the package is fully wound.

Fig. 16 is a detail view of the manually-operated means for rotating the cam box so as to move and hold the thread layer away from the periphery of the package.

Figure 18:
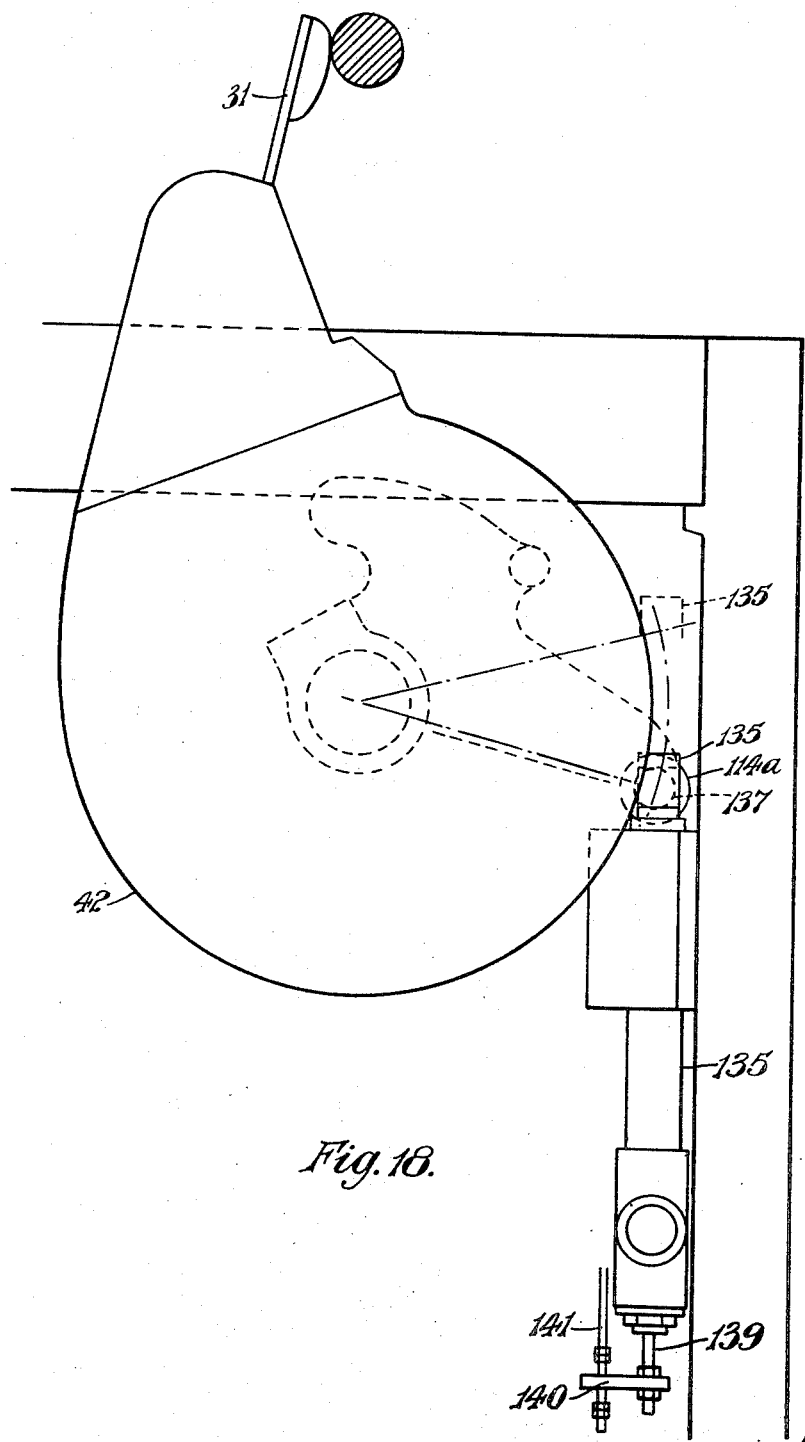

Figs. 17 and 18 are detail views, partly in section, of an oil check mechanism for allowing the thread layer to return so as to again contact the spindle or tube thereon or the package periphery without damage to the thread layer.

As shown in Fig. 1, the cross-over $a$ has an angle which is considered to be suitable for a firm package of the diameter stated. In dotted lines $a^1$ and $b^1$ are shown the angle which would be obtained for a package wound according to the prior art having sixteen cross-overs throughout the wind. The very much smaller angle of cross-over at $a^1$, $b^1$ on the completed package would be such that the coils would tend to fall off at the end or, in other words, the structure of the package would be prejudiced by the use of such a large number of cross-overs on that large diameter.

In Fig. 2 there is shown in dotted lines $e^1$, $f^1$, $g^1$, $h^1$, the wind which would be obtained on this smaller diameter if wound according to the prior art, using only four cross-overs throughout the wind. These angles are very much steeper than with the sixteen cross-overs, but little advantage, if any, is obtained as regards the structure of the package, i. e., its ability to maintain its shape.

The changes of ratio throughout the winding of the package according to this invention as the diameters increase, are indicated in Fig. 1. That is to say, one starts on an initial diameter of perhaps 2" and the gearing is arranged to provide sixteen cross-overs up to a 3" diameter of package, whereupon the gear ratio is changed to give 12 cross-overs until the package reaches 4" in diameter, and so on until the package reaches 9.6" in diameter, when the gear ratio is changed from 5 cross-overs to 4 cross-overs in the length of the package.

Referring now to Figs. 3 to 18 of the drawings a winding machine constructed in accordance with the invention comprises a framework 20 in the lower part of which is suitably mounted an electric motor 21 on the shaft of which is a double pulley 22 adapted to drive, through a belt 23 a further double pulley 24 on a countershaft 25 suitably journalled at the upper part of the frame. Also mounted on the countershaft is a stepped cone pulley 26 which, through a belt 27 drives a complementary cone pulley 28 mounted on a cop spindle 29 adapted to receive the yarn or the tube on which the yarn is to be wound. Obviously, the position of the belt 27 on the two cone pulleys 26, 28, will decide or control the speed of rotation of the spindle 29 relatively to the motor speed.

In the initial stage of the winding the belt is disposed (as indicated in full lines, Figs. 3 and 6) so as to give the highest ratio of drive between portion 26a of the cone pulley 26 on the countershaft 25 and the portion 28a of the cone pulley 28 on the spindle 29. In this position there will be 12 cross-overs on the package 30. Whilst the diameter of the package grows from the initial diameter, approximately 3", indicated at 30 in Fig. 6, when winding on to a tube, the yarn during the 12 cross-over stage is laid at a certain angle, substantially equal to 14°. When the diameter of the package reaches approximately 4½" (indicated at 30¹ in Fig. 6), the belt 27 is automatically transferred to the next position, 26b, 28b, on the cone pulleys 26, 28 to give a reduction in the speed of rotation of the package spindle 29, and this reduction results in the number of cross-overs being reduced from 12 to 10, even though the speed of the traverse of the thread layer 31 (shown in dotted lines resting on the spindle 29 before the winding of a package, and in full lines in its final position on completion of winding, Fig. 6) still remains the same, as the speed of rotation of the cam shaft 32 which through a cam (to be later referred to) mounted thereon effects the traverse of the thread layer, is not affected in any way by the change of position of the belt 27. When the package diameter reaches 6", the belt is automatically transferred to the next position, 26c, 28c, on the cone pulleys 26, 28, and the speed of rotation of the spindle is further reduced, resulting in the number of cross-overs being reduced from 10 to 8. A reduction in the spindle speed and number of cross-overs is effected at each 1½" growth in package diameter until it reaches 10½", when the number of cross-overs will be 4 and this number is retained until the package diameter reaches 12", when the winding operation will be complete. Movement of the belt 27, to the further positions 26d, 28d, 26e, 28e, 26f, 28f, 26g, 28g to effect the changes in speed, is by mechanism which comprises a belt fork 33 adapted to slide along a stationary inclined support 34 and having tines 34a extending on either hand thereof so that both stretches of the belt 27 will always be in alignment one with the other, thereby eensuring that the belt cannot wander, and give a ratio different from the intended ratio for each change. The belt fork 33 (as illustrated particularly in Figs. 4, 6 and 7) is urged down the said inclined support 34 by means of a suspended weight 35 connected thereto by a chain 36 passing over a guide pulley 37. In order to ensure that the movement of the belt fork 33 down the inclined support member will be intermittent, to vary the spindle speed and the number of cross-overs at particular stages only in the winding, the belt fork 33 is held in each of its several positions by making contact successively with a series of abutments or dogs or stop members 38 (only some of which, for clarity, are illustrated in the drawings) mounted at spaced intervals on an inclined "dog" shaft 39 suitably supported in bearings in the framework. The dogs 38 are so arranged that the effective parts thereof, which respectively resist the movement of the belt fork 33 down its supporting member, are at different angles around the axis of the said inclined shaft 39, so that, as the said shaft is partially rotated during the winding operation, the belt fork under the action of weight 35 will make contact with each dog in turn, for a specified period of time prior to being released by the continued rotation of the shaft 39. On release from one dog, the belt fork again moves down its inclined support member until it contacts or is brought to rest by the next succeeding dog. The dogs can be adjusted around the shaft 39 to vary the angles between their operative parts, and thereby effect variation of the time between and change of speed.

The partial rotation of the dog shaft to allow of intermittent movement of the belt fork 33 is effected by links 40 and 41 (see particularly Fig. 8) connecting the shaft 39 to the cam box 42 (described later), whereby the angular movement of the cam box around the cam shaft 32, as the package grows in diameter, is imparted to the shaft 39. By this means the growth in diameter of the package 30 controls the speed of rotation of the spindle 29, and consequently controls the number of cross-overs at any particular stage of winding. The speed of rotation of the spindle will decrease each time the belt fork moves to shift the belt 27 onto another part of the cone pulleys 26, 28 until the belt is disposed between the portions 26g, 28g of the said cone pulleys with the belt fork abutting the adjustable stop member 44 on the supporting member 34 (see Fig. 7).

At the start of the winding of a package, it is usual to wind manually several turns on the spindle or the tube (when used) and during this manual winding operation the belt fork 33 is restored to its initial position ready for winding the next package. As illustrated in Figs. 4, 5, 6, and 7, such return movement of the belt fork is by means of a chain 45 passing round a drum or sheaf 46 suitably mounted on a shaft 47 journalled in bearings 48 in the framework of the machine, said drum or sheaf being so arranged that it will pay-off chain 45 as the belt fork is drawn down its inclined supporting member 34, but can be rotated in the opposite direction by gear pinions 49, 50 and actuating handle 51 to bring or return the belt fork 33 to said initial position.

Referring now to Figs. 5, 9, 10 and 11, formed integral with or attached to the double pulley 24 (mentioned above) associated with the cone pulley drive is a further pulley 52, which, through a band or belt 53 drives a slightly tapered pulley 54 keyed on the extended boss 55 of a pinion 56 rotatably mounted on a stud shaft. The pinion 56 meshes with a gear wheel 57, the latter being keyed on the cam shaft 32 (see Fig. 11) on which is mounted a cam 59 (see Fig. 10) forming part of the traverse mechanism for the thread layer 31. The thread layer is adapted to be reciprocated by the cam 59 longitudinally of the package being wound, and is slidably mounted on two rods, 60, 61, disposed parallel to the cam shaft 58 and extending across a cam box 42 housing the said cam. The cam is engaged by rollers 62, 63 rotatably mounted on an extension of the thread layer 31.

The tread layer itself is in the form of a bracket upstanding through a slot 64 in the cam box, and having a thread guide 31a in the form of an eye or slot at its upper end. The cam box is journalled on the cam shaft and is arranged so that it can pivot around said shaft to allow the thread layer 31 to accommodate itself to the growth in diameter of the package 30 being wound, the said thread layer being adjustably loaded into contact with the periphery of the package so that the pressure of the layer on the package can be varied. The pressure imparted by the thread-layer is by means of a weight 65 (see Fig. 3), slidable along a pivoted arm 66, said arm being connected to the cam box by a link 67 located on the weight side of the arm pivot 68, but so that the thread layer is urged into contact with the package. The said pivoted arm 66 may be graduated to denote selected positions for the weight and the weight is such that, according to its position on the arm, the pressure of the thread layer 31 on the package 30 can vary (say) from 70 lbs. down to nothing.

To enable the machine to wind a cop or package with either of what are known in the trade as open or close herringbone pattern and "honeycomb" wind, should such change of wind be required, or alternatively, to enable the machine to wind yarns of differing diameters, say from a fine silk to a sash cord, the machine is fashioned with a change-speed mechanism whereby the number of rotations of the cam shaft 32 relative to the rotations of the package spindle 29 can be varied by a mere fraction of a unit. Such mechanism includes the before-mentioned, slightly-tapered pulley 54 driven from the countershaft 25. It will be obvious that the position of the belt on the periphery of the pulley 54 will control the speed of rotation of the cam shaft, and will therefore control the speed of traverse of the thread layer 31 relative to the rotation of the cop spindle. To vary the position of the belt on this pulley, a belt fork 69 (as illustrated in Fig. 11) is provided slidably mounted on a short spindle 70, the movement of the belt fork being effected by a manually operated screwed spindle (not shown). The belt fork is positively moved so that the belt cannot wander and thus interfere with the nature or type of the wind. If the belt 53 is positioned on the tapered pulley 54 at the position which will give a speed ratio between the pulley 52 on the countershaft and said tapered pulley, whose value is a whole integer, the resultant wind of the package will be "honeycomb," but, as the belt is moved towards the smallest diameter of the tapered pulley (i. e. to the right in Fig. 5) the wind will be open or close herringbone pattern, as the said ratio will then be the integer plus a fraction, the value of the fraction controlling whether the wind is open or close. The type of wind is therefore dependent on the position of belt 53. It must be understood that once the belt is set on the tapered pulley for any particular wind or series of winding operations, or to accommodate a yarn or thread of the particular diameter, it is left untouched in its adjusted position until all the yarn of that diameter has been wound. To obtain different variations in the speed of rotation of the cam shaft 32 to suit different lengths and diameters of packages to be wound, the pinion 56 can be removed and a pinion having a different number of teeth substituted in lieu thereof.

When winding large-size packages, and to prevent or damp out vibration in the spindle 29 during the rotation of the cop or package being wound, said spindle, at its outer end, is journalled in an arm 71, which, when required can be swung out of the way for a purpose to be later described. Such arm is slidably keyed on a stationary shaft 72 and can be locked in position on the shaft by a locking stud 73 (see Figs. 3 and 6). When it is desired to remove a wound package from the spindle 29, the arm is unlocked and moved axially so that it is drawn clear of the end of the spindle. In this position, the arm is freed from its key 74 and the arm can swing by gravity so that it lies in a pendent vertical position, well clear of the spindle and package, and so that the wound package can be removed axially from the spindle.

The yarn or thread t to be wound is drawn off a large creel bobbin 75 by rotation of the package, and (as illustrated in Fig. 6), after leaving the bobbin the thread passes around guide pulleys 76, 77, 78 and 79 prior to passing through the eye of the thread layer 31. The creel bobbin is freely mounted on centres, 80, 81 (see Figs. 4, 12 and 13), the centre 80 being retractable axially of the bobbin by a bell-crank lever 82 mounted on oscillating shaft 82a and chain 83 against the action of a spring 84. When it is desired to remove an empty creel bobbin the operator presses down on the foot treadle 85 forming one of the arms of lever 82, and the retractable centre 80 is withdrawn to free the empty bobbin and to allow of the new bobbin being placed in position.

The creel bobbin is rotated to pay-off merely by the pull of the thread being wound on to the package. Means is provided to prevent overrunning of the creel bobbin 75 and to assist in the control of the tension in the thread, and such means comprises a pair of pivoted arms or jaws 86, 87 (see particularly Fig. 13) fashioned at their upper ends with bobbin-engaging faces 86a, 87a adapted to engage frictionally the periphery of the bobbin 75, and having extensions at the lower ends, beyond their common pivot 88, arranged so that, as the said extensions are moved further apart the jaw-like members 86, 87 are also constrained to move away from each other. In Fig. 13 of the drawings only the arm or jaw 87 is shown in full for the purpose of clarity, but jaw 86 is exactly the same in construction and operation as jaw 86. As the bobbin 75 is reduced in diameter by the unwinding of the yarn or thread therefrom, the jaws 86, 87 are caused to move inwards towards each other by weights hanging from the outer ends of arms forming part of such jaws, as is indicated by weight 89 and arm 90 with reference to jaw 87. To enable an empty bobbin to be removed after withdrawal of centre 80 and a new creel bobbin to be placed in position, the jaws, which will be disposed as shown in dotted lines in Fig. 13, are opened, when required, by cams 91, 92, mounted on oscillating shaft 93 (see Figs. 12 and 13), the latter being partially rotated by gear pinions 94, 95 rotated by handle 96 whenever it is necessary to open the jaws to their full extent. The handle 96 and pinion 94 are both freely mounted on shaft 96a, and driving connection is provided by a driving pin 96b. Such cams engage bowls 97 mounted on the said jaw extensions, and thereby force them apart, to cause the jaws to open, thus leaving sufficient clear space for the removal of an empty bobbin and a full one to be fitted in lieu thereof.

The packages to be wound in the machine forming the particular example are substantially 12" in length by 12" in diameter, and apart from their weight, it is usually somewhat difficult to remove a wound package from the spindle as the core tube is caused to bind on the spindle by the winding operation. In some cases, however, the core tube is eliminated and the winding of the package is effected on the bare spindle, and it is therefore no easy matter for a woman operative to remove the packages from the spindle. Consequently, means is provided to remove each wound package from the spindle mechanically. Such package-removal means comprises, as illustrated in Figs. 3, 6 and 6a, a plate 98 mounted on a shaft 99 axially movable in its supports, 99a, 99b, said plate having a bifurcated free end 100 which freely embraces the spindle 29 behind the package 30. The supports 99a, 99b are slidable along rods 99c, 99d. On the said slidable shaft is fashioned a series of rack teeth 101 adapted to be engaged by a pinion 102 mounted on a short shaft 103 located at right angles to the plate shaft 99. The boss of said pinion 102 is extended, and keyed thereon is an operating member 104 having a series of arms or spokes 105 radially disposed, whereby on manual rotation of the operating member by the operative, the shaft 99 and plate 98 will slide axially, i. e., to the left in Fig. 6a, and thus push the wound package 30 off its spindle 29.

The operation of removing and replacing the cops can be effected only after the above-mentioned arm 71 supporting the end of the spindle 29 has been freed from the spindle end and allowed to fall into a vertical position as previously described.

On positioning a new tube p (if used) on the spindle 29 the ejector plate 98 is retracted to its initial position ready for the next winding operation, and the spindle-supporting arm is then moved back to its normal position so that it can re-engage the end of the spindle and be locked in position.

In some cases, say on stoppage of the machine due to breakage of the thread, or on completion of the winding of a package, it is necessary to lift the thread layer 31 away from the periphery of the package. To do this by hand would entail considerable effort by the operative and therefore suitable mechanism for the purpose is provided operated by a suitably-shaped cam groove 106 in the support 99b for the package removal plate shaft. Such plate 98, when in inoperative position, as illustrated in Fig. 4a, is located well clear of the package being wound, so that the plate must be moved axially a short distance, marked X in the said Fig. 6a, before it contacts the cop or its tube p. This initial movement is made use of to lift and hold the thread layer 31 away from the package periphery. Located in the same groove 106 is a bowl 107 fitted on one end of a link 108 pivoted at 109, said link having a pawl 110 pivoted thereto and adapted to engage ratchet teeth 111, in a quadrant 112 mounted on an extended boss 113 of the cam box 42, so that on rotation of the operating member 104 for the cop-removal mechanism, the initial movement X causes the pawl 110 to engage the ratchet teeth 111 on the quadrant 112 and rotate the cam box 42 (against the action of weight 65) a sufficient extent to lift the thread layer 31 away from the package periphery. If the thread layer has been moved for re-threading purposes after thread breakage, the operating member 104 is returned to its initial position prior to resumption of the winding operation, and as the pawl returns to its former position, a rearward extension 110a of said pawl engages a stationary abutment 113 which causes the pawl to pivot and raise its operating nose from engagement with the teeth. Buffer means are incorporated in the machine to prevent too rapid return of the thread layer on to the package periphery, and, as illustrated in Figs. 17 and 18, said means comprise an oil check mechanism consisting of a reservoir 128, having a long, vertical, open-topped limb 129 and a shorter limb 130 interconnected by a passage 131. At the upper end of the short limb 130 is a valve seating 132 and valve 133, the said valve and seating being located at the lower end of a cylinder 134, disposed parallel to the limb 129, and screwed into the short limb. Slidably located within the cylinder 134 is a piston 135, which projects outside the upper end of the cylinder, and said piston is fashioned at its upper end with a transverse slot 136 in which is located a bowl 137 rotatably mounted on a stud 138 attached to the bracket 114a fixed in the cam box boss or journal 113. The valve 133 is provided with a valve rod 139 which extends vertically downwards through the lower periphery of the wall of the passage 131. Attached to the external lower end of the rod 139 is a bar 140, to which is attached a vertical rod 141 which terminates in a finger-operated lever (not shown) attached to the handle 51 which is operated when returning the belt fork 33 to its initial position ready for the next winding operation. The oil check mechanism operates as follows: During winding of the package, the cam box 42 (as already stated) is moved angularly about the cam shaft 32, thus causing the bowl 137 to lift the piston 135 in the cylinder 134. As the piston rises, the oil in the reservoir 128 lifts the valve 133 and flows into the cylinder to fill the portion thereof below the piston, and therefore prevents any return of the cam box, as the valve 133 will close on its seat and trap the oil in the cylinder. On completion of the winding of a package, the thread layer 31 is lifted clear of the periphery of the package by the initial movement of the operating member 104 as previously described. The thread layer remains in the raised position by the column of oil below the piston after the wound package has been doffed, and even after the member 104 has returned to its initial position to release the pawl 110. The motor is then re-started and on operation of handle 51 to return belt fork 33 to the starting position, the operative depresses the rod 141 by manipulation of the finger-operated lever, and the valve is lifted from its seat to allow the piston and the cam box to return slowly under the action of weight 65 and thus return the thread layer without damage thereto, so that it again makes contact with the spindle or tube mounted thereon. The arrangement is such that the return of the belt fork 33 and the thread layer 31 are effected simultaneously on operation of handle 51 so that the machine is ready for the next winding operation as soon as the belt 27 is positioned between the portions 26a, 28a of the pulleys 26, 28. Obviously, the oil check mechanism will operate in similar manner if, for any reason, the thread layer has to be lifted from the periphery of the package at any time during winding operation, for example, after the machine has stopped, due to breakage of the thread.

Obviously, when a package is being removed from the spindle the initial movement of the operating member 104 will raise the weft layer 31, and will continue to hold same in that position until after the package has been removed and the mechanism is ready to start the winding operation for the next package. It is only as the package-removal plate 98 moves the last short distance X of its retracting movement that the thread layer is free to move so that it may again rest on the package periphery.

On completion of a wound package the winding mechanism is stopped automatically, and for this purpose knock-off mechanism is provided comprising a stud 114 (see Figs. 6, 8, 14 and 15) mounted on a bracket 114a fixed to the extended boss or journal 113 of the cam box 42, said stud moving angularly about the cam shaft 32 as the cam box moves angularly to accommodate the growth in diameter of the package. The stud 114 is adjustable to enable the machine to knock-off at different diameters to suit different sizes of cop. When the package has reached a certain predetermined diameter, the stud will have moved sufficiently to bring it into contact with an inclined face 115 forming part of an arm or lever 116 mounted on a knock-off shaft 117, the arrangement being such that, as the stud makes such contact with the said inclined face, angular movement is imparted to the knock-off shaft. The knock-off shaft has a further arm or lever mounted thereon in the form of a catch 118, which engages the end of a bar 119 (see Fig. 15) spring-loaded to slide horizontally when free, but at right angles to the knock-off shaft 117, and such sliding movement can only take place after the said catch has been released from engagement with said bar. The catch is spring-loaded into engagement with the bar by a tension spring 120, and the angular movement of the knock-off shaft in the required direction (anticlockwise in Fig. 15) under the influence of the stud 114 associated with the cam box moves the catch 118 out-of-engagement with the end of the bar 119 and allows the latter to move end on. Mounted on said bar and about midway of its length is a plate or bracket 121 having an inclined face 121a which is engaged by a bowl or roller 122 of an electrical starter switch 123 for controlling the operation of the driving motor for the winding machine. In Fig. 15 the bowl or roller 122 is shown in full lines to indicate the motor is "on," whilst the dotted lines indicate its position when the motor is in the "off" position. The switch for said motor is spring-loaded into the "off" position, and end-on movement of the bar 119 in one direction to the position shown in Fig. 15, will cause the inclined face 121a to press down the starter switch of the motor and thus start up the machine. The starting movement of the bar 119 is effected by means of a chain 124 and foot treadle 125 (see Fig. 4). When the bar is moved to the starting position it will be held there by the said spring-loaded catch 118 engaging the end thereof, and release of the bar is effected, as already described, by rotation of the knock-off shaft 117 under the action of the stud 114. As soon as the bar 119 is released from the catch its spring 126 will slide it in the opposite direction (to the left in Fig. 15) thus allowing the starter switch of the motor to spring into the "off" position.

To release the catch 118 from the bar 119 at any particular time, to stop the machine, the catch is extended in length to form a thumb press 127, so that it can be pivoted manually to release the bar. The bar is also adapted to be released, and the machine stopped, on breakage of the yarn t, and for this purpose, the guide pulley 77 is mounted in a bracket 128 slidably located on a vertical spindle 129, the said pulley being supported in a loop formed by the thread or yarn. When the yarn breaks, the pulley will fall by gravity and will drop on to a small arm 130 mounted on the knock-off shaft 117 to impart sufficient rotation to the latter to free the catch 118 from the spring-loaded bar 119 and the machine will come to rest as soon as the bar reaches the "stop" position. The knock-off shaft 117 is limited in rotary movement by a stop member 117a.

Obviously, the machine can be adjusted to wind any desired size of package and also to effect any desired number of cross-overs within the limits of the machine, the machine described herein being designed for a maximum number of 12 cross-overs during the initial stage of winding a 12" diameter cop, but the number of cross-overs would vary according to the size of the cop to be wound, if the angle of lay is to remain at 14°.

I declare that what I claim is:

1. A machine for the precision cross-winding of yarns, comprising a frame and a prime mover therein, a rotatable cop spindle mounted on the frame for holding the cop to be wound, variable speed driving means including a pair of stepped cone pulleys and a belt thereon, a belt shifter and means for urging the belt shifter from the high-ratio drive-end of the pulleys to the low-ratio drive-end, a series of steps mounted to intercept said belt shifter progressively opposite the respective steps of the pulleys, and means for imparting the movements to said movable member as the cop grows to said steps for their progressive removal from intercepting position, said variable speed driving means coupling the rotatable cop spindle to said prime mover, a reciprocating yarn layer mounted on said frame for laying the yarn cross-wise on the cop, and constant speed-driving mechanism coupling said yarn layer to said prime mover, said yarn layer including a member movable away from the cop spindle by the growth of the cop, and said variable speed driving means being operatively associated with said movable member for operation at pre-determined diameters of cop, for progressive reduction of spindle speed.

2. A machine for the precision cross winding of yarns, comprising a frame and a prime mover thereon, a reciprocating yarn guide for laying the yarn cross-wise as it is wound, and constant speed driving mechanism connecting said yarn guide to the prime mover, said driving mechanism including a rotary cam mounted in the frame and said yarn guide being mounted for pivotal movement about the axis of said cam as the wound yarn increases in diameter, a rotary cop spindle mounted in the frame and a pair of stepped cone pulleys with driving belt, one of said pulleys being attached to said spindle, a belt shifter movable endwise between the pulleys, a shaft parallel with the axes of said pulleys and a series of stops thereon at progressive angular positions around the shaft, a radial member on said shaft and a link connecting said member to the pivotal yarn guide, progressive pivotal movement of said guide rotating said shaft to remove successive stops from the path of said belt-shifter.

3. A machine according to claim 2, wherein said cone pulleys have conical ramp portions between the steps to facilitate movement of the belt from step to step.

4. A machine according to claim 2, having an inclined guide for the belt shifter and a weight and cable urging the belt shifter to the lower end of said guide, a winding drum mounted at the higher end of said guide and a cable thereon secured to said belt shifter, and a winding gear and handle for rotating said drum to return the belt shifter to the higher end of the guide.

5. A machine according to claim 2, wherein the yarn guide is provided with loading means pressing it yieldingly against the wound yarn, an axially movable ejector for displacing the wound package from the spindle, a hand or foot actuated operating means for said ejector, a ratchet quadrant co-axial with and movable with the pivotal movements of the yarn guide and a pawl carried by a pivoted lever, with cam means operated by initial movement of the ejector for imparting movement to such lever, pawl and quadrant to lift the yarn guide off the wound yarn.

6. A machine according to claim 2, wherein the prime mover is coupled to the spindle and to the yarn guide through a common countershaft and wherein the drive from the said countershaft to the cone pulleys includes a further variable speed means for small changes of ratio between said spindle and yarn guide.

7. A machine according to claim 2, having an inclined guide for the belt shifter and a weight and cable urging the belt shifter to the lower end of said guide, a winding drum mounted at the higher end of said guide and a cable thereon secured to said belt shifter, and a winding gear and handle for rotating said drum to return the belt shifter to the higher end of the guide, and wherein the yarn guide is provided with loading means pressing it yieldingly against the wound yarn, an axially movable ejector for displacing the wound package from the spindle, a hand or foot actuated operating means for said ejector, a ratchet quadrant co-axial and movable with the pivotal movements of the yarn guide, and a pawl carried by a pivoted lever, with cam means operated by initial movement of the ejector for imparting movement to such lever, pawl and quadrant to lift the yarn guide off the wound yarn, and also having a fluid support for supporting the yarn guide when raised from the wound yarn, and a release member adjacent the said winding gear for exhausting the fluid support when the belt-shifter has reached the higher end of its guide.

8. A machine for the precision cross-winding of yarns, comprising a frame, a prime mover therein and a countershaft driven by such prime mover, a rotatable cop spindle mounted on the frame, a pair of stepped cone pulleys and belt for driving said spindle, and a pair of taper pulleys and belt driving said cone pulleys from said countershaft, a reciprocating yarn guide in the frame, and a rotary cam for reciprocating the guide, the guide being pivotally mounted about the axis of the cam for movement towards and away from said cop spindle, constant speed driving means between said countershaft and cam, a belt-shifter and inclined guide therefor, for moving the belt from step to step of said cone pulleys, a weight and cable urging the belt shifter to the lower end of said guide, a winding drum mounted at the higher end of said guide and a cable thereon secured to said belt shifter, and a winding gear and handle for rotating said drum to return the belt shifter to the higher end of the guide, loading means for said yarn guide pressing it yieldingly against the wound yarn, an axially movable ejector for displacing the wound package from the spindle, a hand or foot actuated operating means for said ejector, a ratchet quadrant co-axial with and movable with the pivotal movements of the yarn guide and a pawl carried by a pivoted lever, with cam means operated by initial movement of the ejector for imparting movement to such lever, pawl and quadrant to lift the yarn guide off the wound yarn.

9. A machine according to claim 8 having a fluid support for supporting the yarn guide when raised from the wound yarn, and a release member adjacent the said winding gear for exhausting the fluid support when the belt-shifter has reached the higher end of its guide.

FRANK OSBORNE.

References Cited in the file of this patent

UNITED STATES PATENTS

| Number | Name | Date |
|---|---|---|
| 707,684 | Fay et al. | Aug. 26, 1902 |
| 716,923 | McKean | Dec. 30, 1902 |
| 786,863 | Wardwell | Apr. 11, 1905 |
| 933,092 | Metz | Sept. 7, 1909 |
| 1,234,388 | Rand | July 24, 1917 |
| 2,093,815 | McIlvried | Sept. 21, 1937 |
| 2,150,309 | Atwell | Mar. 14, 1939 |
| 2,205,384 | Abbott | June 25, 1940 |
| 2,284,730 | Elvin | June 2, 1942 |
| 2,338,722 | Jackson | Jan. 11, 1944 |
| 2,372,136 | Swift | Mar. 20, 1945 |